US012589676B2

(12) United States Patent
Lee et al.

(10) Patent No.: US 12,589,676 B2
(45) Date of Patent: Mar. 31, 2026

(54) VEHICLE SEAT CONTROL APPARATUS AND METHOD

(71) Applicant: Hyundai Transys Inc., Seosan-si (KR)

(72) Inventors: Suk Woo Lee, Hwaseong-si (KR); Jiyong Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 198 days.

(21) Appl. No.: 18/410,478

(22) Filed: Jan. 11, 2024

(65) Prior Publication Data

US 2024/0227630 A1     Jul. 11, 2024

(30) Foreign Application Priority Data

Jan. 11, 2023     (KR) ........................ 10-2023-0004113

(51) Int. Cl.
*B60N 2/02*     (2006.01)
*B60N 2/06*     (2006.01)
(52) U.S. Cl.
CPC ............. *B60N 2/0272* (2023.08); *B60N 2/06* (2013.01)
(58) Field of Classification Search
CPC ................... B60N 2/0272; B60N 2/06; B60N 2002/0055; B60N 2/0277; B60N 2/0244; B60N 2/01; B60N 2/0268
USPC .......................................................... 701/49
See application file for complete search history.

(56) References Cited

U.S. PATENT DOCUMENTS

2020/0139853 A1*   5/2020   Nawrocki ................ B60N 2/16
2020/0171979 A1*   6/2020   Yetukuri .................. B60N 2/01
2022/0258652 A1    8/2022   Pedronno et al.

FOREIGN PATENT DOCUMENTS

EP            4026730 A1      7/2022
KR    10-2021-0099708 A1     8/2021

OTHER PUBLICATIONS

Daniel Klinteback, "Extended European Search Report for EP Application No. 24151370.4", Jun. 24, 2024, EPO, Munich, Germany.

* cited by examiner

*Primary Examiner* — Helal A Algahaim
*Assistant Examiner* — Ashleigh Nicole Turnbaugh
(74) *Attorney, Agent, or Firm* — Bridgeway IP Law Group, PLLC; Jihun Kim

(57)     ABSTRACT

A vehicle seat control apparatus according to an exemplary embodiment includes a coordinate calculating unit which calculates an interference coordinate based on a current position of a motion seat, among a plurality of seats in a vehicle; a position determining unit which determines whether the motion seat and the other seat interfere with each other using the interference coordinate; and a controller which selectively controls the motion seat or the other seat depending on whether the motion seat and the other seat interfere with each other.

4 Claims, 13 Drawing Sheets

SLIDE MOTOR FRONT END BASED ON ACTUAL VEHICLE DATA

FIG. 6

Figure 8:
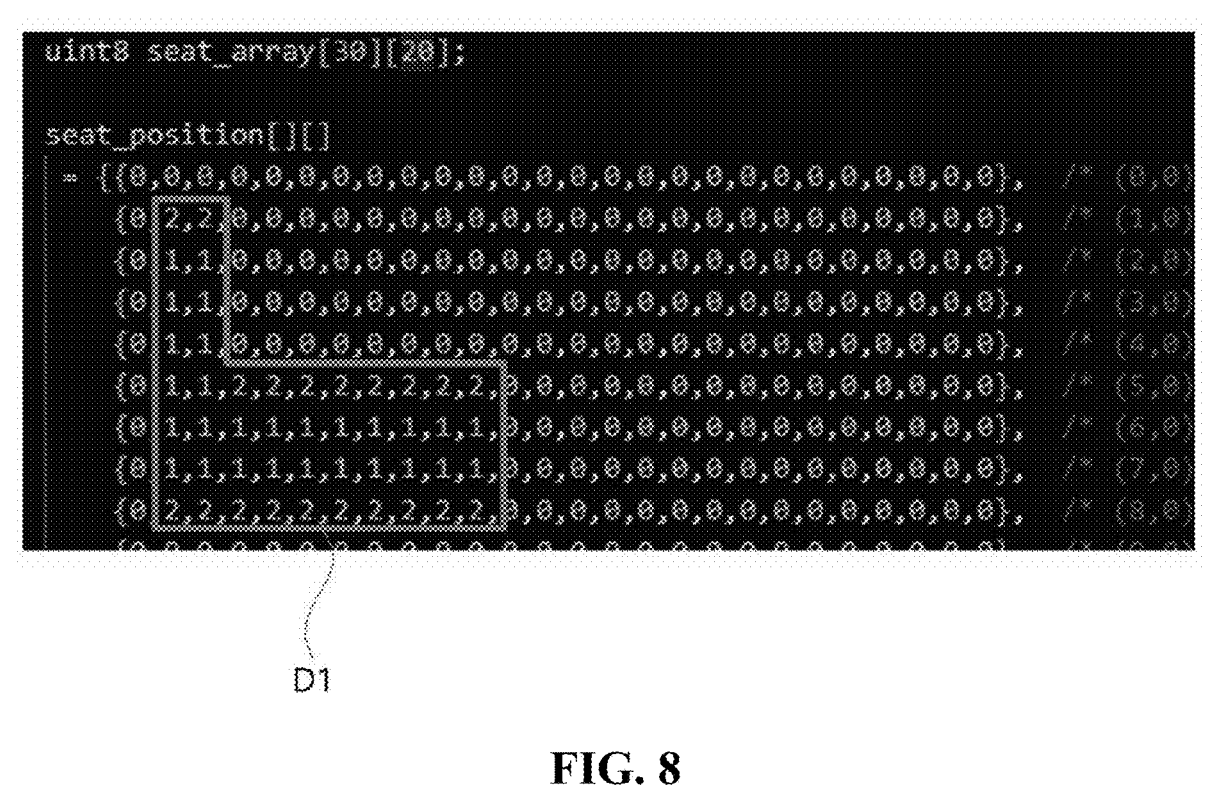

```
uint8 seat_array[30][20];

seat_position[][]
= {{0,0,0,0,0,0,0,0,0,0,0,0,0,0,0,0,0,0,0,0,0,0,0,0,0},   /* (0,0)
    {0,2,2,0,0,0,0,0,0,0,0,0,0,0,0,0,0,0,0,0,0,0,0,0,0},   /* (1,0)
    {0,1,1,0,0,0,0,0,0,0,0,0,0,0,0,0,0,0,0,0,0,0,0,0,0},   /* (2,0)
    {0,1,1,0,0,0,0,0,0,0,0,0,0,0,0,0,0,0,0,0,0,0,0,0,0},   /* (3,0)
    {0,1,1,0,0,0,0,0,0,0,0,0,0,0,0,0,0,0,0,0,0,0,0,0,0},   /* (4,0)
    {0,1,1,2,2,2,2,2,2,2,0,0,0,0,0,0,0,0,0,0,0,0,0,0,0},   /* (5,0)
    {0,1,1,1,1,1,1,1,1,1,0,0,0,0,0,0,0,0,0,0,0,0,0,0,0},   /* (6,0)
    {0,1,1,1,1,1,1,1,1,1,0,0,0,0,0,0,0,0,0,0,0,0,0,0,0},   /* (7,0)
    {0,2,2,2,2,2,2,2,2,2,0,0,0,0,0,0,0,0,0,0,0,0,0,0,0},   /* (8,0)
```

WHEN RECLINE MOTOR MOVES BACK

VEHICLE SEAT CONTROL APPARATUS AND METHOD

CROSS-REFERENCE TO RELATED APPLICATIONS

This application claims priority to and the benefit of Korean Patent Application No. 10-2023-0004113 filed in the Korean Intellectual Property Office on Jan. 11, 2023, the entire contents of which are incorporated herein by reference.

TECHNICAL FIELD

The present disclosure relates to a vehicle seat control apparatus and a vehicle seat control method.

BACKGROUND ART

Generally, in the vehicle, seats are provided so that occupants may sit in front and back including a driver's seat.

The seat is configured to be movable back and forth along the length direction of the vehicle to keep the occupant's comfortable state depending on the physical condition.

Recently, as autonomous vehicles are developed, seats are automatically movable to various positions. However, when the positions of the plurality of seats are adjusted in the vehicle, there may be interference between occupants or collisions between the occupants and objects depending on the movement of the seats.

In the related art, seat position information for every seat is shared through a vehicle network (CAN communication) to check whether there is interference between seats. For example, when a second-row seat is in an interference position before performing a folding function of a third-row seat, interference information between seats may be transmitted through the CAN communication.

However, in the related art, the interference between seats is determined for only a specific seat or only when a specific function is performed.

Data required to implement a logic to determine the interference between seats is transmitted or received through the CAN communication so that when an error occurs in the CAN network, there is a possibility of an erroneous operation.

Further, due to a structure in which a single controller is applied to every seat, it is difficult to apply a seat integrated controller which will be prepared in the future.

RELATED ART DOCUMENT

Patent Document (Patent Document 1) Korean Unexamined Patent Application Publication No. 10-2021-0099708

SUMMARY OF THE INVENTION

Therefore, the present invention has been made in an effort to provide a vehicle seat control apparatus and a vehicle seat control method which enable integrated control of all the seats using a coordinate logic which coordinates a range of a vehicle interior or a seat frame and prevent or avoid the interference between seats.

In order to achieve the above-described objects, according to an aspect of the present disclosure, a vehicle seat control apparatus includes: a coordinate calculating unit which calculates an interference coordinate based on a current position of a motion seat, among a plurality of seats in a vehicle; a position determining unit which determines whether the motion seat and the other seat interfere with each other using the interference coordinate; and a controller which selectively controls the motion seat or the other seat depending on whether the motion seat and the other seat interfere with each other.

The interference coordinate includes a cushion interference coordinate range and a backrest interference coordinate range of the motion seat.

The coordinate calculating unit sets a reference cushion coordinate range based on a cushion upper end of the motion seat and sets a range extended by at least one space in an x-axis direction and a y-axis direction based on the reference cushion coordinate range as the cushion interference coordinate range.

When the backrest of the motion seat is in a correct position state without an inclination, the coordinate calculating unit sets a reference backrest coordinate range based on the backrest rear end of the motion seat, and sets a range extended by at least three spaces in the x-axis direction based on the reference backrest coordinate range as the backrest interference coordinate range.

When the backrest of the motion seat is in a reclined state with a predetermined inclination, the coordinate calculating unit sets a reference backrest coordinate range based on the inclination and the size of the backrest, and sets a range extended by at least three spaces in the x-axis direction based on the reference backrest coordinate range as the backrest interference coordinate range.

The vehicle seat control apparatus further includes a collecting unit which collects a mounting position and size data of the plurality of seats.

The vehicle seat control apparatus further includes a motion sensing unit which senses a manual or automatic motion of the seat.

When it is determined as an interference situation of the motion seat and the other seat, the controller stops the operation of the motion seat and controls a motion of the other seat to move out of the interference coordinate.

In order to achieve the above-described objects, according to another aspect of the present disclosure, a vehicle seat control method includes: a coordinate calculating step of calculating an interference coordinate based on a current position of a motion seat, among a plurality of seats in a vehicle, by a coordinate calculating unit; an interference determining step of determining whether the motion seat and the other seat interfere with each other using the interference coordinate, by a position determining unit; and a control step of selectively controlling the motion seat or the other seat depending on whether the motion seat and the other seat interfere with each other, by a controller.

The interference coordinate includes a cushion interference coordinate range and a backrest interference coordinate range of the motion seat.

The coordinate calculating step includes: setting a reference cushion coordinate range based on a cushion upper end of the motion seat and sets a range extended by at least one space in an x-axis direction and a y-axis direction based on the reference cushion coordinate range as the cushion interference coordinate range, by the coordinate calculating unit.

The coordinate calculating step includes: setting a reference backrest coordinate range based on the backrest rear end of the motion seat when the backrest of the motion seat is in a correct position state without an inclination, and setting a range extended by at least three spaces in the x-axis direction based on the reference backrest coordinate range as the backrest interference coordinate range by the coordinate calculating unit.

The coordinate calculating step includes: setting a reference backrest coordinate range based on the inclination and the size of the backrest when the backrest of the motion seat is in a reclined state with a predetermined inclination and setting a range extended by at least three spaces in the x-axis direction based on the reference backrest coordinate range as the backrest interference coordinate range by the coordinate calculating unit.

The vehicle seat control method further includes: prior to the coordinate calculating step, a collecting step of collecting a mounting position and size data of the plurality of seats, by a collecting unit; a coordinating step of coordinating the mounting position and the size data of the plurality of seats, by the coordinate calculating unit; and a current position checking step of checking a current position of the plurality of seats, by the position determining unit.

The vehicle seat control method further includes: after the coordinate calculating step, a motion sensing step of sensing a manual or automatic motion of the seat by the motion sensing unit.

The control step includes: a change control step of when it is determined as an interference situation of the motion seat and the other seat, stopping the operation of the motion seat and controlling a motion of the other seat to move out of the interference coordinate, by the controller.

According to the exemplary embodiments of the present invention, the vehicle seat control apparatus and the vehicle seat control method enable integrated control of all the seats using a coordinate logic which coordinates a range of a vehicle interior or a seat frame and prevent or avoid the interference between seats.

An architecture in which one high performance electronic control unit (ECU) controls all seats in the vehicle may be implemented.

It is possible to be used as a source technology of a seat interference control logic in the future.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 is a view illustrating data to be configured in an actual array after seat coordination;

FIG. 8 is a view illustrating data to be configured in an actual array after interference area coordination of FIG. 7;

FIG. 11 is a view illustrating data to be configured in an actual array after interference area coordination of FIGS. 9 and 10;

Figure 1:
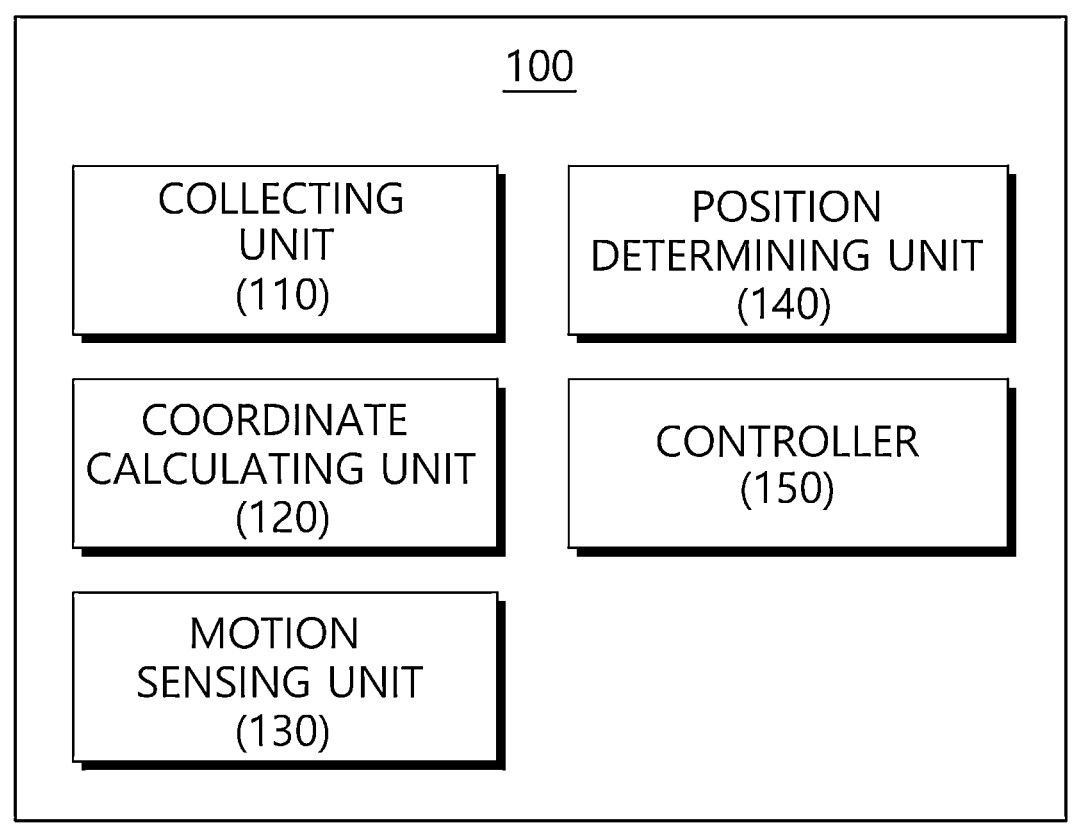
FIG. 1 is a block diagram related to a vehicle seat control apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present disclosure will be described in detail with reference to the accompanying drawings. In the drawings, it should be noted that even though the parts are illustrated in different drawings, it should be understood that like reference numerals refer to like parts of the present invention throughout the several figures of the drawing. Further, hereinafter, exemplary embodiments of the present disclosure will be described. However, it should be understood that the technical spirit of the invention is not restricted or limited to the specific embodiments, but may be changed or modified in various ways by those skilled in the art to be carried out.

FIG. 1 is a block diagram related to a vehicle seat control apparatus according to an exemplary embodiment of the present invention.

Referring to FIG. 1, a vehicle seat control apparatus 100 according to the exemplary embodiments of the present invention enables integrated control of all the seats using a coordinate logic which coordinates a range of a vehicle interior or a seat frame and prevent or avoid the interference between seats.

The vehicle seat control apparatus 100 according to the exemplary embodiments of the present invention includes a collecting unit 110, a coordinate calculating unit 120, a motion sensing unit 130, a position determining unit 140, and a controller 150.

The collecting unit 110 collects a plurality of seat mounting positions in the vehicle and size data. The plurality of seat mounting positions and size data may be provided when the vehicle is manufactured.

The coordinate calculating unit 120 may coordinate a plurality of seat mounting positions and size data to store the plurality of seat mounting positions and size data in a software array variable. In one exemplary embodiment, the coordinate calculating unit 120 coordinates the plurality of seat mounting positions and size data based on a coordinate reduction ratio of 1:10. The coordinate calculating unit 120 sets a cushion front end of a vehicle front seat among the plurality of seats to an x-axis reference point (0 point). The coordinate calculating unit 120 sets an end of a headrest of the vehicle front seat to a y-axis reference point (0 point).

The coordinate calculating unit 120 calculates an interference coordinate based on a current position of the seat. The calculating of interference coordinate will be described in detail with reference to FIGS. 7 to 11.

The motion sensing unit 130 senses a manual or automatic motion of a seat by the user. The motion sensing unit 130 senses a motion by the change in a sensing value of a hole sensor mounted in the seat.

The position determining unit 140 may determine a current position of the seat based on the sensing value of the hole sensor. The position determining unit 140 searches for a surrounding coordinate of a motion seat to determine whether the motion seat interferes with the other seat.

When it is determined that the motion seat interferes with the other seat, the controller 150 may stop the operation of the motion seat. At this time, the controller 150 controls a motion of the other seat to move out of the interference coordinate. When the motion of the other seat is completed, the controller 150 controls again the motion of the seat which stops the operation to prevent the interference situation with the other seat.

Figure 2:
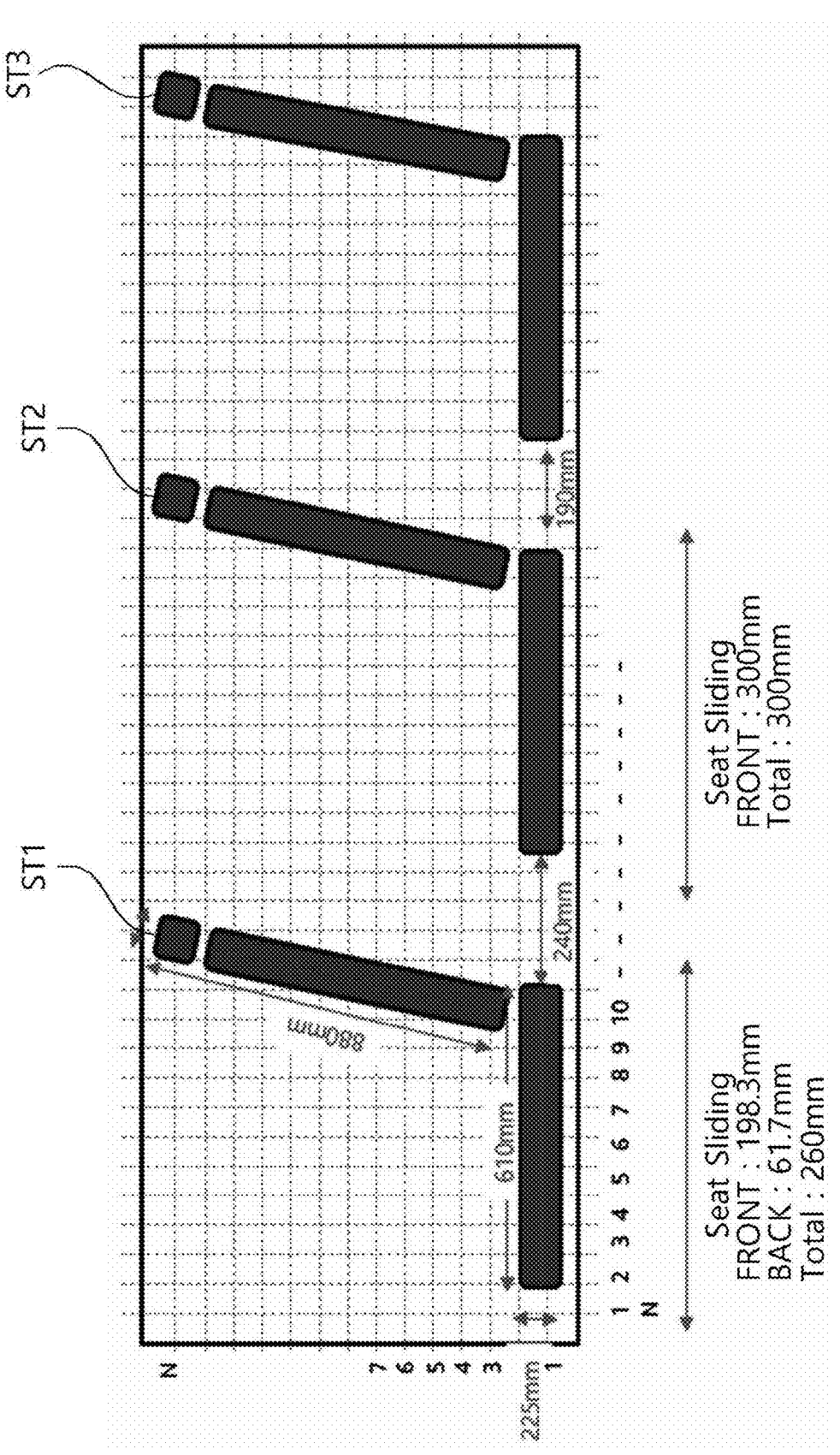
FIG. 2 is a view for explaining a seat mounting position and size data of an actual vehicle.

FIG. 2 is a view for explaining a seat mounting position and size data of an actual vehicle.

Referring to FIG. 2, in the vehicle, a plurality of seats may be mounted. The plurality of seats includes a first seat ST1, a second seat ST2, and a third seat ST3. More or less seats may be provided according to the vehicle specifications. The plurality of seats may be mounted in the vehicle to be slidable in the front and back direction. Backrests of the plurality of seats may be rotatably mounted on the cushions.

The first seat ST1 is mounted in the forward direction with respect to the front and back direction of the vehicle. A length of the cushion in the front and back direction of the first seat ST1 is approximately 610 mm. A length obtained by adding the backrest and the headrest of the first seat ST1 in the up and down direction is approximately 880 mm. A height of the cushion of the first seat ST1 is approximately 225 mm. A sliding length of the first seat ST1 is approximately 198.3 mm in the forward direction. A sliding length of the first seat ST1 is approximately 61.7 mm in the backward direction. An entire sliding length of the first seat ST1 is approximately 260 mm in the front and back direction.

The second seat ST2 is mounted with a distance of approximately 240 mm from the rear end of the first seat ST1. The second seat ST2 has the almost same structure as the first seat ST1, but is not limited hereto.

A sliding length of the second seat ST2 is approximately 300 mm in the frontward direction.

The third seat ST3 is mounted with a distance of approximately 090→900 mm from the rear end of the second seat ST2. The third seat ST3 has the almost same structure as the first seat ST1, but is not limited hereto. The third seat ST3 is fixedly mounted in the vehicle so as not to slide, but is not limited thereto.

Figure 3:
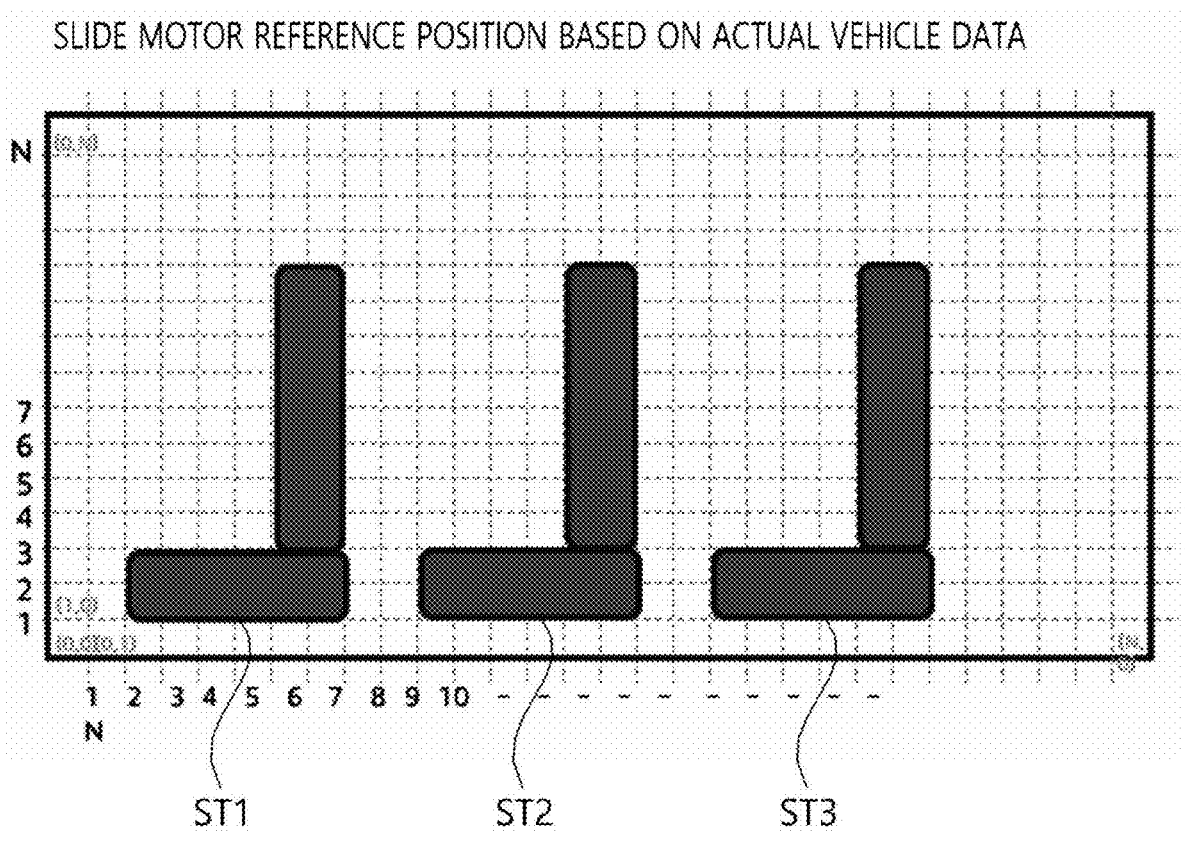
FIG. 3 is a view for explaining a reference position of a slide motor based on an actual vehicle.
Figure 4:
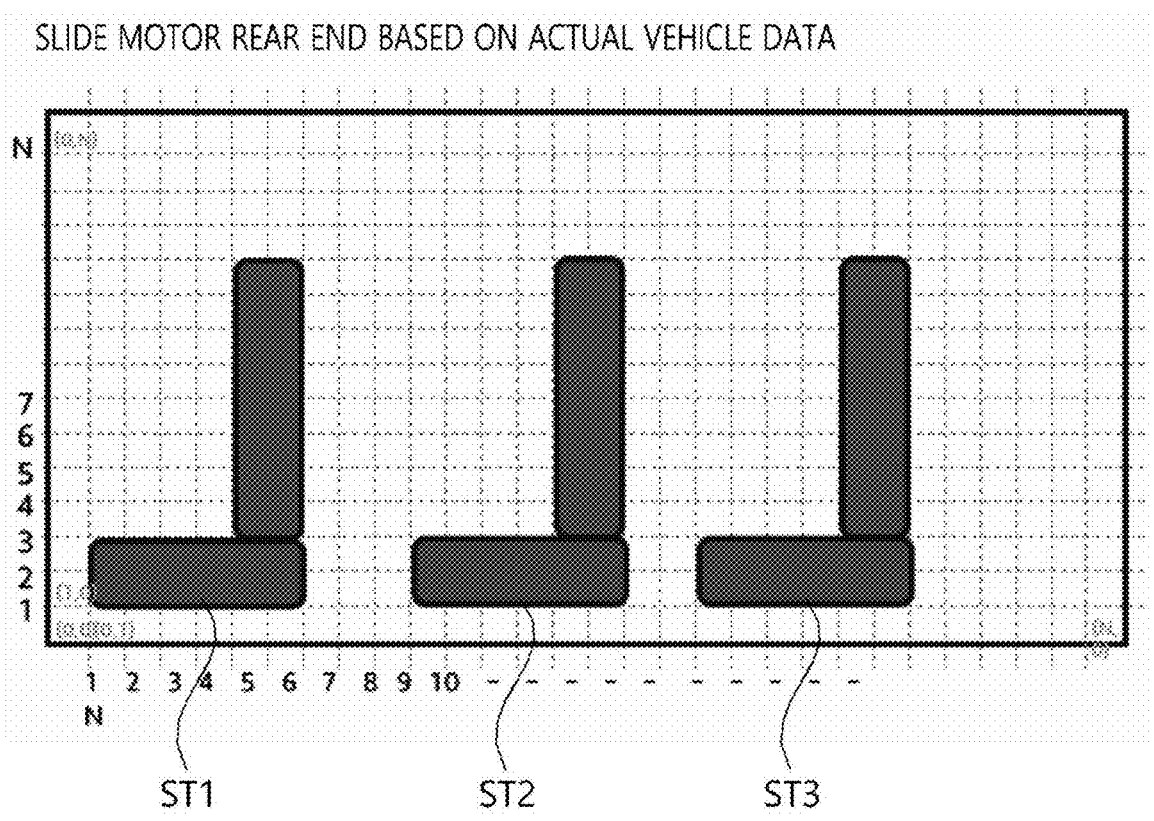
FIG. 4 is a view for explaining a seat rear end position of a slide motor based on an actual vehicle.
Figure 5:
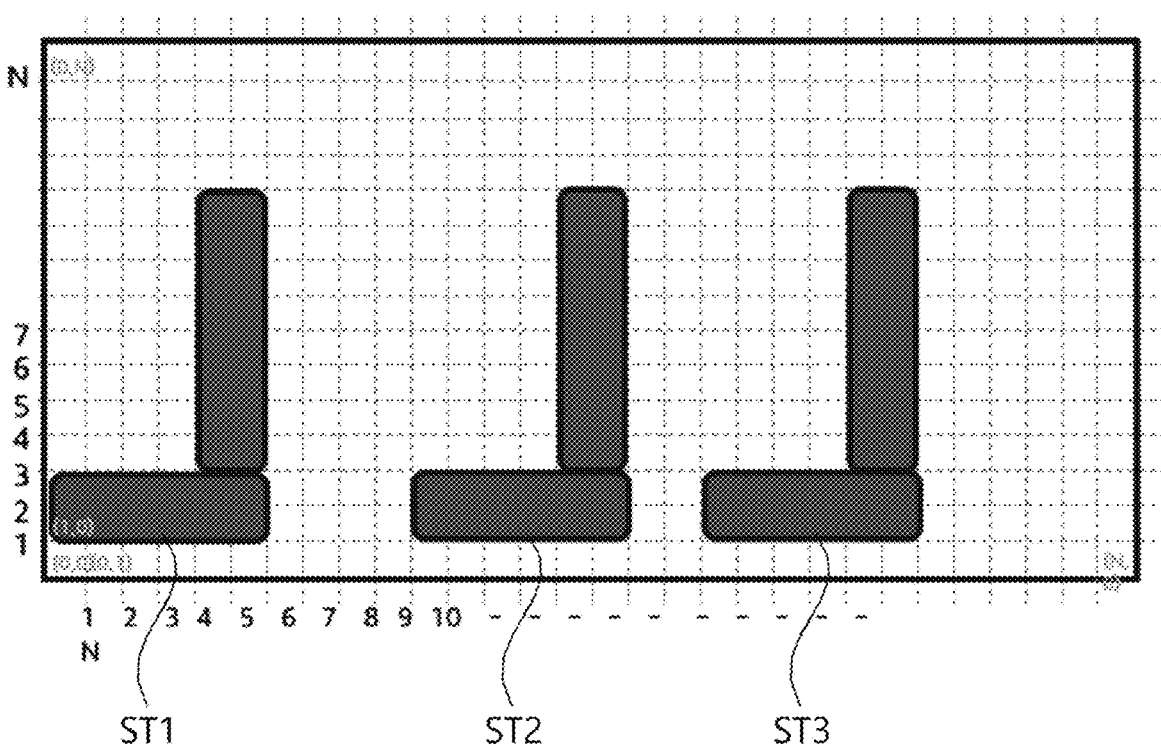
FIG. 5 is a view for explaining a seat front end position of a slide motor based on an actual vehicle.

FIG. 3 is a view for explaining a reference position of a slide motor based on an actual vehicle. FIG. 4 is a view for explaining a seat rear end position of a slide motor based on an actual vehicle. FIG. 5 is a view for explaining a seat front end position of a slide motor based on an actual vehicle.

Referring to FIGS. 3 to 5, in the reference position of the slide motor based on the actual vehicle data, a front end of the cushion of the first seat ST1 may have a coordinate value of (2, 1) to (2, 3).

In the rear end position of the slide motor based on actual vehicle data, a cushion front end of the first seat ST1 has a coordinate value of (1, 1) to (1, 3).

In the front end position of the slide motor based on actual vehicle data, a cushion front end of the first seat ST1 has a coordinate value of (0, 1) to (0, 3). The description of the remaining seat position coordinate will be omitted.

Figure 6:
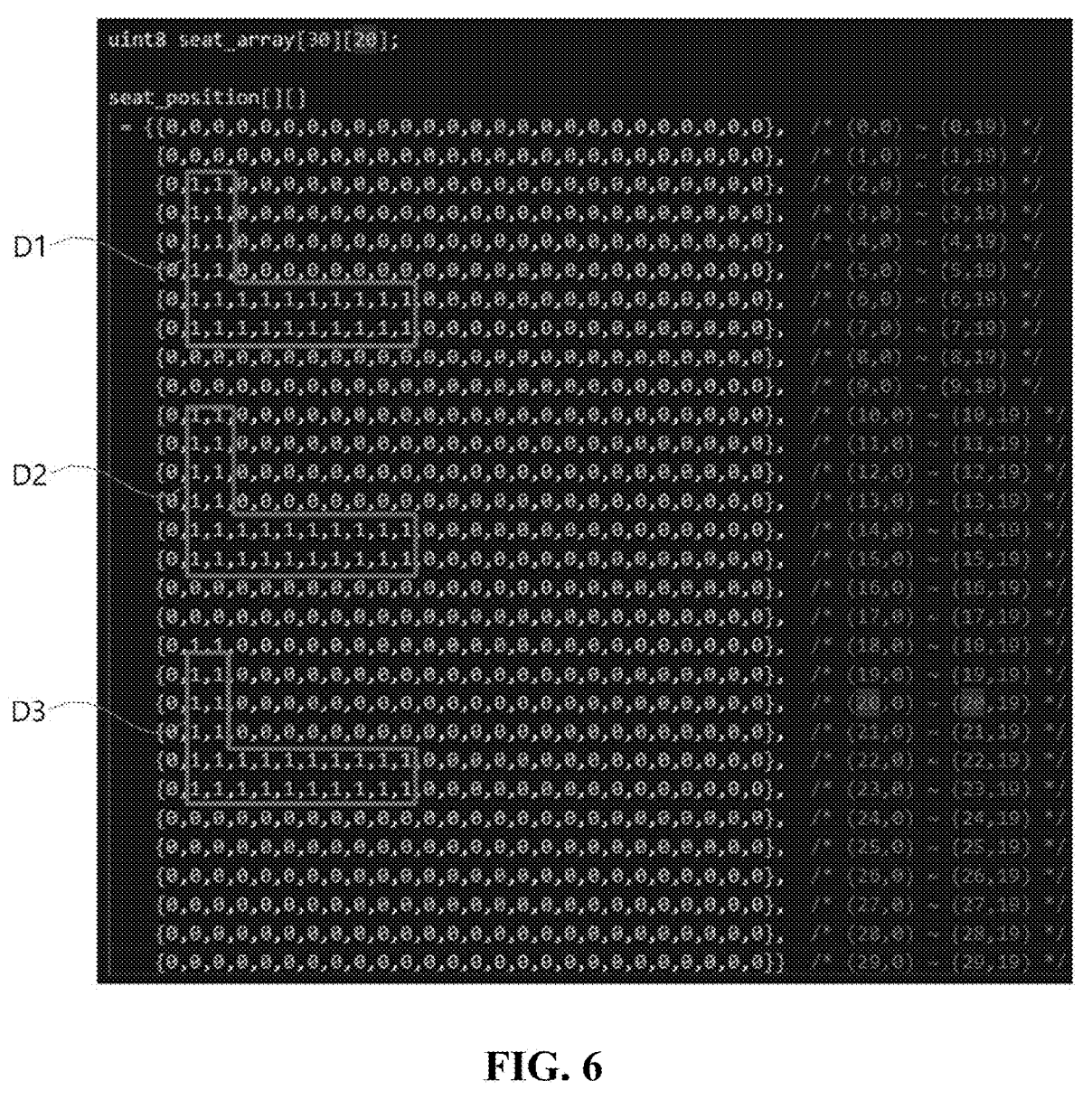

FIG. 6 is a view illustrating data to be configured in actual array after seat coordination.

Referring to FIG. 6, after coordinating the plurality of seats, stored variable data will be checked. The variable data includes first variable data D1 corresponding to the first seat ST1, second variable data D2 corresponding to the second seat ST2, and third variable data D3 corresponding to the third seat ST3.

Figure 7:
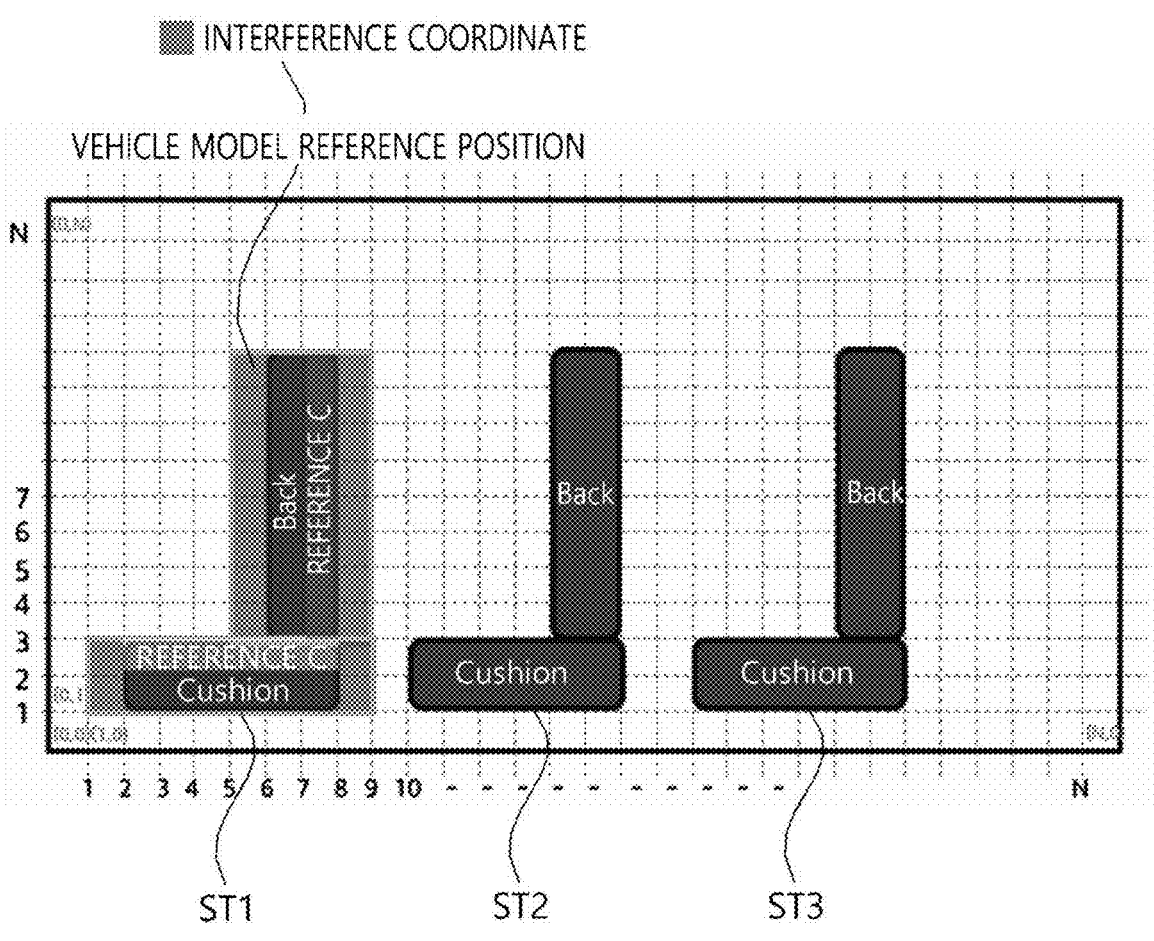
FIG. 7 is a view illustrating an example of a method for setting an interference area coordinate of a seat.

FIG. 7 is a view illustrating an example of a method for setting an interference area coordinate of a seat. FIG. 8 is a view illustrating data to be configured in an actual array after interference area coordination of FIG. 7.

Referring to FIGS. 7 and 8, an interference area coordinate of the first seat ST1 in a correct position state can be checked.

The correct position state of the first seat ST1 is a state in which an angle between the backrest and the cushion is 90 degrees.

The coordinate calculating unit 120 may set a reference cushion coordinate range "C" based on a cushion upper end of the first seat ST1. In one exemplary embodiment, the reference cushion coordinate range "C" includes (2, 2), (3, 2), and (4, 2) to (7, 2).

The coordinate calculating unit 120 sets a range extended by one space in both directions of the x-axis based on the reference cushion coordinate range "C" as an x-axis interference range and a range extended by one space in below in the y-axis as a y-axis interference range. By doing this, the coordinate calculating unit 120 sets the cushion interference coordinate range including an x-axis interference range and a y-axis interference range.

In one exemplary embodiment, the cushion interference coordinate range is coordinates obtained by adding (1, 2), (8, 2), (2, 1), (3, 1), and (4, 1) to (8, 1) to the reference cushion coordinate range "C". The cushion interference coordinate range is appropriately adjusted according to a thickness of the cushion.

The coordinate calculating unit 120 may set a reference backrest coordinate range "B" based on a backrest rear end of the first seat ST1. In one exemplary embodiment, the reference backrest coordinate range "B" includes (7, 3), (7, 4), and (7, 5) to (7, 11).

The coordinate calculating unit 120 sets a range including a range extended by two spaces in a left direction of the x-axis and a range extended by one space in a right direction of the x-axis based on the reference backrest coordinate range "B" as a backrest interference coordinate range.

In one exemplary embodiment, the backrest interference coordinate range is coordinates obtained by adding (5, 3), (5, 4), (5, 5) to (5, 11), (6, 3), (6, 4), (6, 5) to (6, 11), (8, 3), (8, 4), and (8, 5) to (8, 11) to the reference backrest coordinate range "B". The backrest interference coordinate range is appropriately adjusted according to a size of the backrest.

The coordinate calculating unit 120 generates first variable data D1 including a cushion interference coordinate range and a backrest interference coordinate range.

The position determining unit 140 determines whether the first seat ST1 interferes with the other seat based on the first variable data D1 when the first seat ST1 operates.

Figure 9:
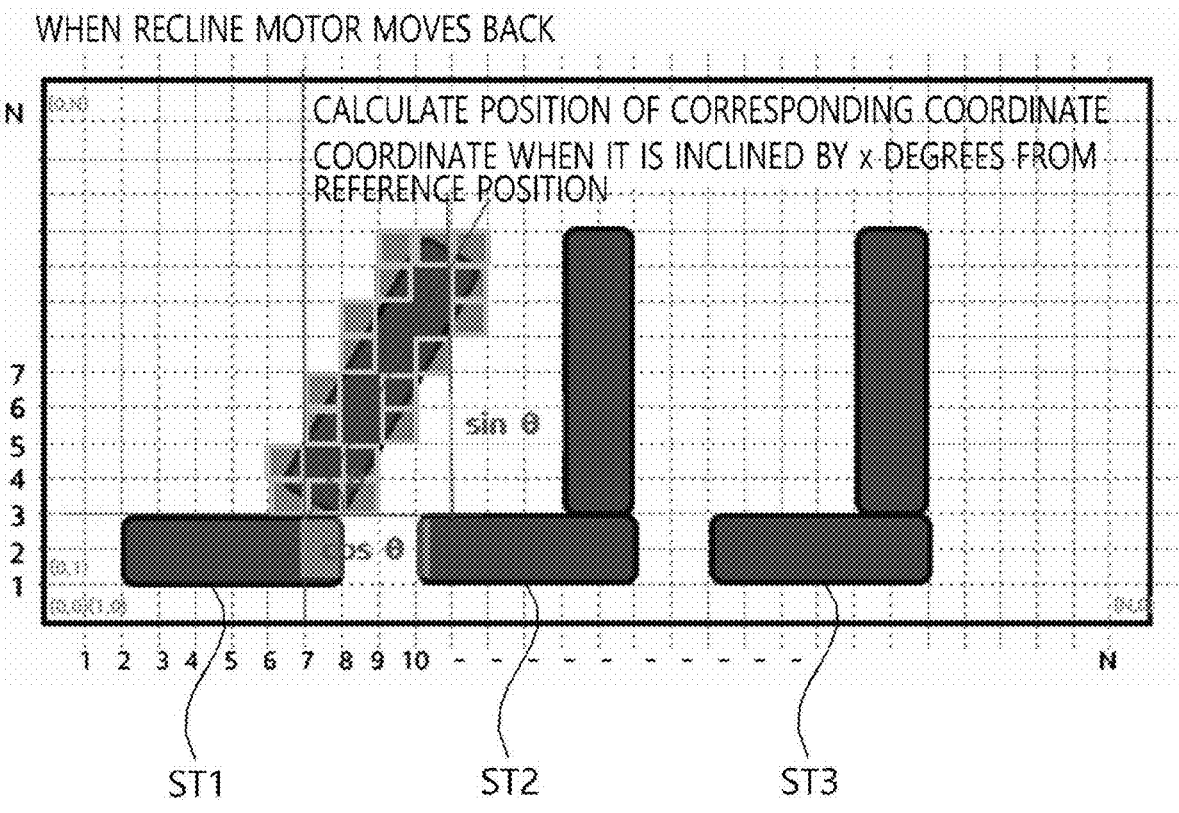
FIG. 9 is a first view illustrating another example of a method for setting an interference area coordinate of a seat.
Figure 10:
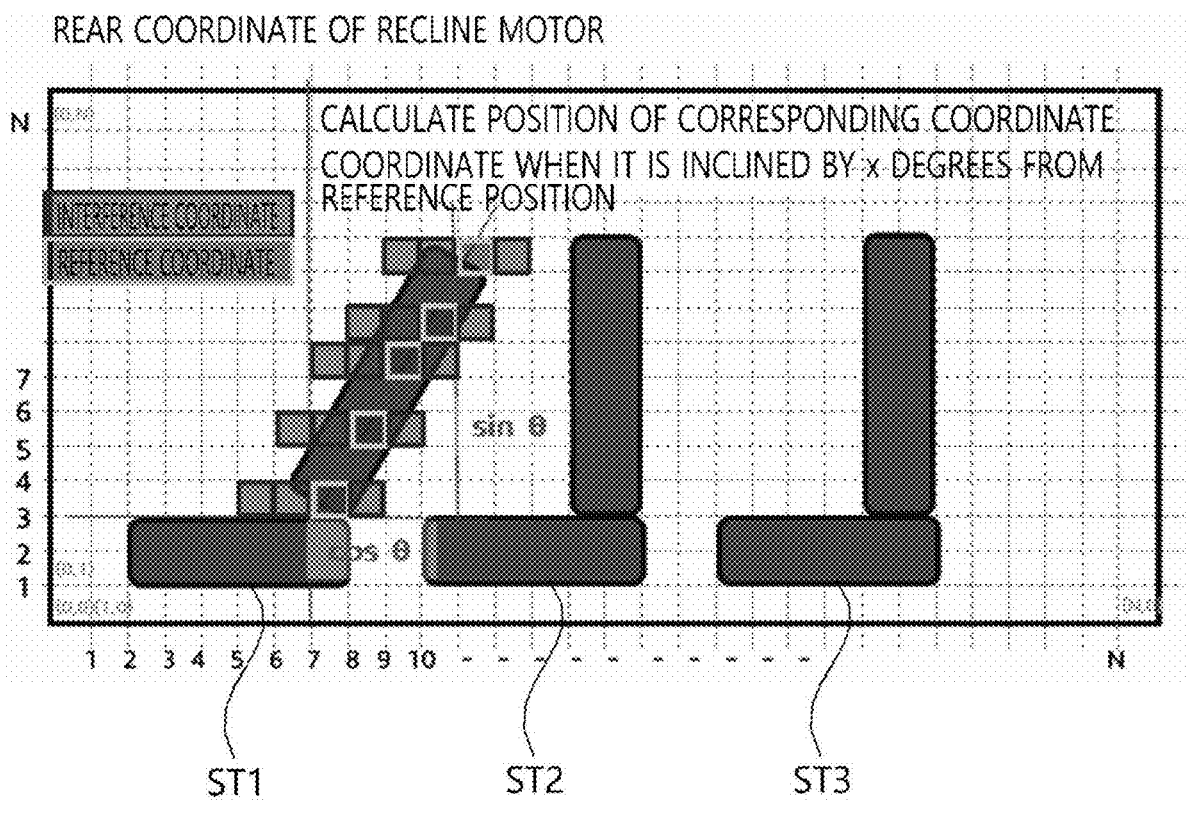
FIG. 10 is a second view illustrating another example of a method for setting an interference area coordinate of a seat.

FIG. 9 is a first view illustrating another example of a method for setting an interference area coordinate of a seat. FIG. 10 is a second view illustrating another example of a method for setting an interference area coordinate of a seat.

Figure 11:
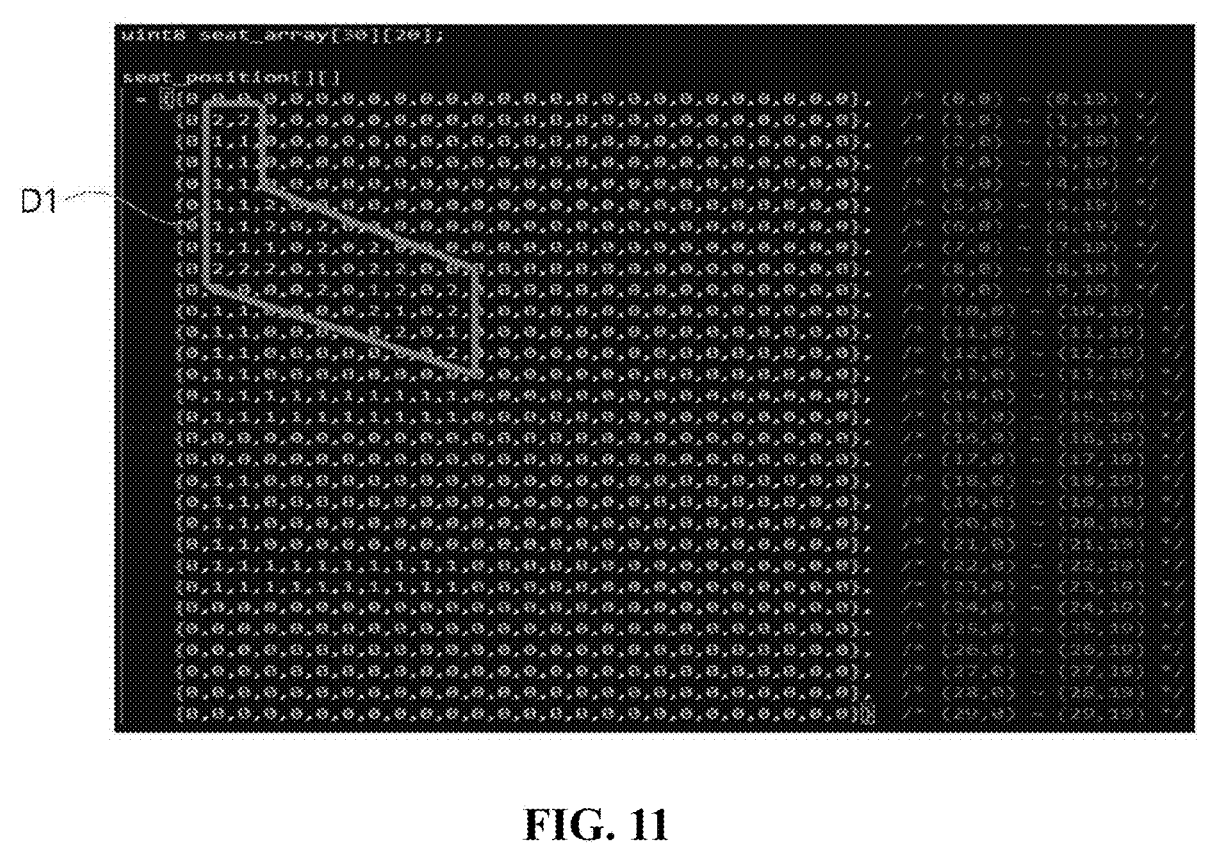

FIG. 11 is a view illustrating data to be configured in an actual array after interference area coordination of FIGS. 9 and 10.

Referring to FIGS. 9 to 11, an interference area coordinate of the first seat ST1 in a reclined state with a predetermined inclination can be checked.

The reclined state of the first seat ST1 is a state in which an outer angle between the backrest and the cushion is approximately 60 degrees.

A method for setting the reference cushion coordinate range and the cushion interference coordinate range is the same as described in FIG. 7 so that a detailed description will be omitted. The coordinate calculating unit 120 sets the reference backrest coordinate range based on an outer angle between the cushion and the backrest of the first seat ST1 in the reclined state.

In one exemplary embodiment, the coordinate calculating unit 120 calculates a variation of the x-axis coordinate by multiplying a length (900 mm) of the backrest and a cosine θ (an outer angle between the cushion and the backrest). The variation of the x-axis coordinate is represented by the following Equation 1.

$$\text{Cos}60° * 9 = 0.5 * 9 = 4.5 \approx 5 \qquad \text{<Equation 1>}$$

In Equation 1, the variation of the x-axis coordinate includes five spaces in the x-axis direction from a zero point (a rear end of the backrest).

In one exemplary embodiment, the coordinate calculating unit 120 calculates a variation of the y-axis coordinate by multiplying a length (900 mm) of the backrest and a sine θ (an angle between the backrest and the vertical line perpendicular to the cushion). The variation of the y-axis coordinate is represented by the following Equation 2.

$$\text{Sin}60° * 9 = 0.86 * 9 = 7.74 \approx 8 \qquad \text{<Equation 2>}$$

In Equation 2, the variation of the y-axis coordinate includes eight spaces in the y-axis direction from a zero point (an upper end of the cushion).

The coordinate calculating unit 120 calculates a target coordinate by calculating an upper coordinate. In one exemplary embodiment a lower end and an upper end of the backrest of the first seat ST1 may be set as reference points. A first reference point of the backrest lower end of the first seat ST1 may be (7, 3). A second reference point of the backrest upper end of the first seat ST1 may be (7+4, 3+7)=(11, 10). The coordinate calculating unit 120 may calculate a straight line equation when the first reference point and the second reference point are known, as represented by the following Equation 3.

$$y = \frac{7x - 37}{4} \qquad \text{<Equation 3>}$$

The coordinate calculating unit 120 calculates a reference backrest coordinate range by substituting the variation of the x-axis coordinate into the straight line equation of Equation 3.

In one exemplary embodiment, the reference backrest coordinate range includes (7, 3), (8, 5), (9, 7), (10, 8), and (11, 10).

In the backrest interference coordinate range of the reclined seat, there is no change in the coordinate of the backrest lower end with respect to the correct position state, but only the coordinate of the upper end of the backrest is changed.

The coordinate calculating unit 120 sets a range including a range extended by two spaces in a left direction of the x-axis and a range extended by one space in a right direction of the x-axis based on the reference backrest coordinate range as a backrest interference coordinate range.

In one exemplary embodiment, the backrest interference coordinate range may be a coordinate obtained by adding (5,3), (6,5), (7,7), (8,8), (9,10), (6,3), (7,5), (8,7), (9,8), (10,10), (8,3), (9,7), (10,7), (11,8), and (12,10) to the reference backrest coordinate range. The backrest interference coordinate range is appropriately adjusted according to a size of the backrest.

The coordinate calculating unit 120 generates first variable data D1 including a cushion interference coordinate range and a backrest interference coordinate range.

The position determining unit 140 determines whether the first seat ST1 interferes with the other seat based on the first variable data D1 when the first seat ST1 operates.

Figure 12:
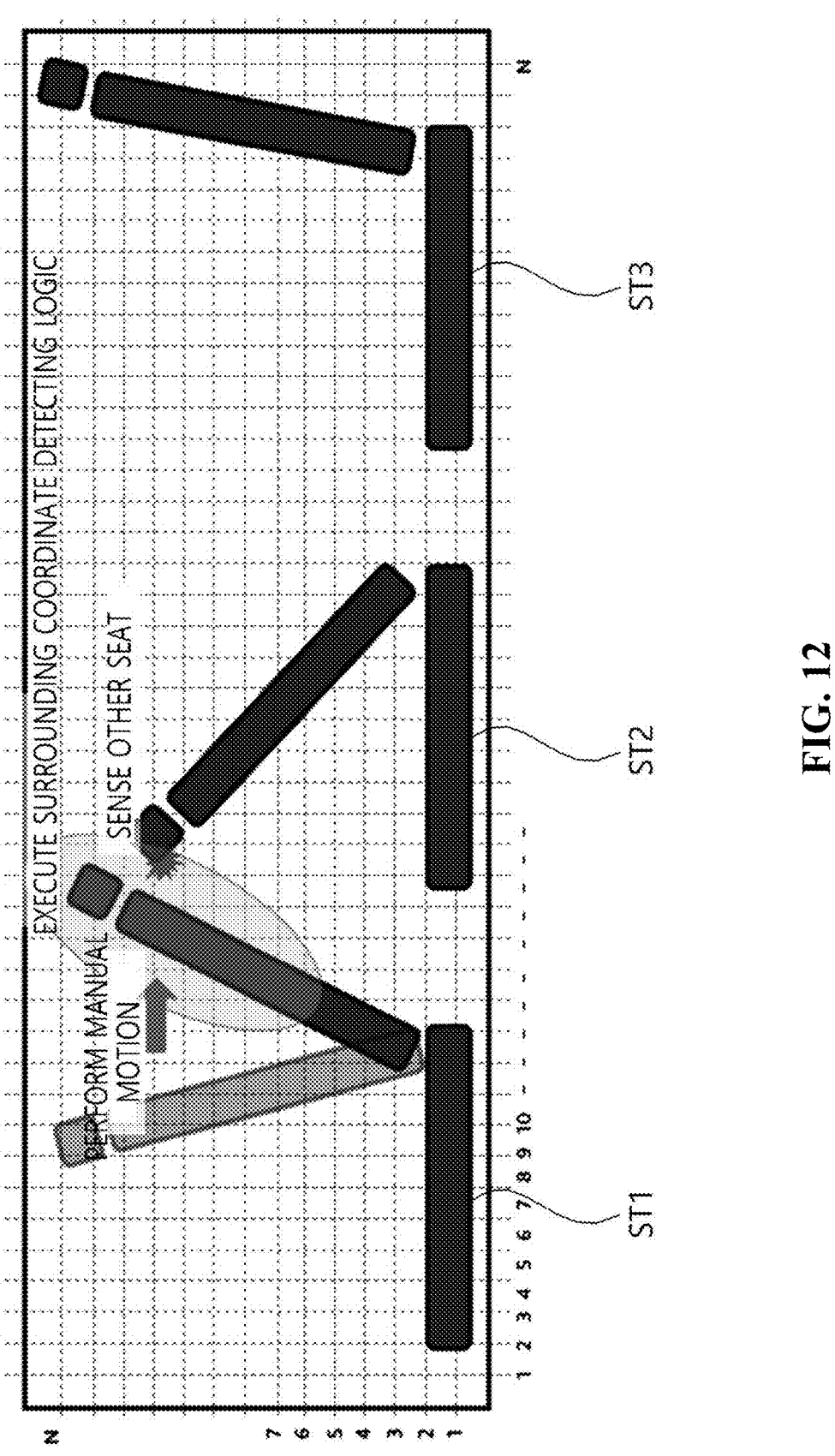
FIG. 12 is a view for explaining an operation of avoiding interference in accordance with a seat manual or automatic motion.

FIG. 12 is a view for explaining a seat associated motion scenario utilizing a coordinating method of a seat position.

Referring to FIG. 12, a plurality of seats performs a manual or automatic motion by a user. Here, the automatic motion includes relax/return, IMS, or folding/unfolding.

The motion sensing unit 130 senses the manual or automatic motion of the seat. The position determining unit 140 searches around the coordinate in which the motion seat is located when the motion of the seat is sensed. Here, in the case of the automatic motion, the position determining unit 140 checks the motion range coordinate to a target motion position of the seat before performing the motion.

The position determining unit 140 determines whether to sense the other seat in a surrounding coordinate and a motion range coordinate.

When the other seat is not located around the coordinate, the controller 150 controls the seat motion to perform a manual or automatic motion.

When the other seat is located around the coordinate, the controller 150 controls the seat motion to stop manual or automatic motion.

In the meantime, when the other seat is located around the coordinate, the controller 150 continuously controls the operation of the motion seat after controlling the change in the position of the other seat.

Figure 13:
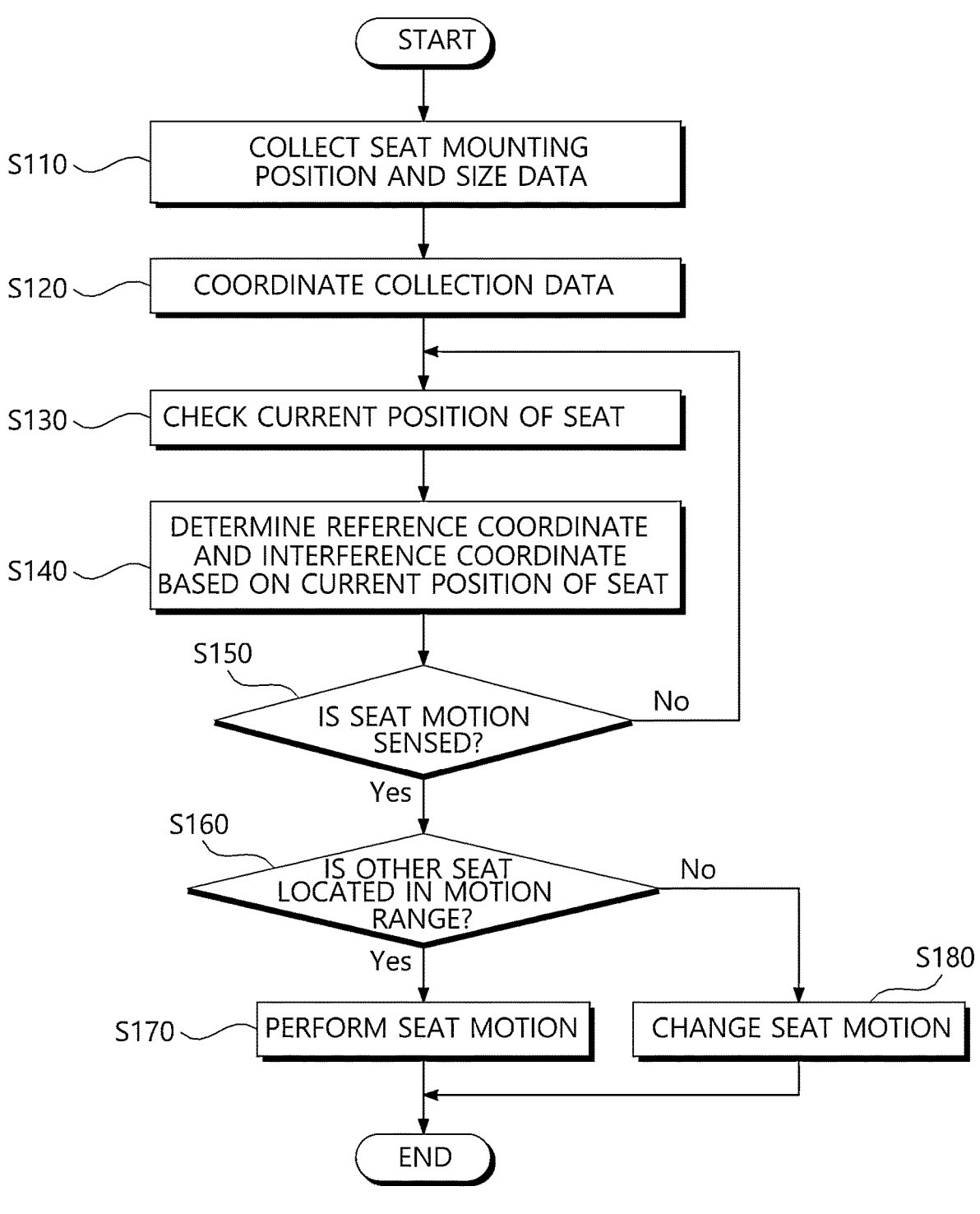
FIG. 13 is a flowchart of a vehicle seat control method according to an exemplary embodiment of the present invention.

FIG. 13 is a flowchart of a vehicle seat control method according to an exemplary embodiment of the present invention.

Referring to FIG. 13, a vehicle seat control method according to the exemplary embodiments of the present invention enables integrated control of all the seats using a coordinate logic which coordinates a range of a vehicle interior or a seat frame and prevent or avoid the interference between seats.

In a collecting step S110, the collecting unit 110 collects a plurality of seat mounting positions in the vehicle and size data. The plurality of seat mounting positions and size data may be provided when the vehicle is manufactured.

In the coordination step S120, the coordinate calculating unit 120 may coordinate a plurality of seat mounting positions and size data to store the plurality of seat mounting positions and size data in a software array variable. In one exemplary embodiment, the coordinate calculating unit 120 coordinates the plurality of seat mounting positions and size data based on a coordinate reduction ratio of 1:10. The coordinate calculating unit 120 sets a cushion front end of a vehicle front seat among the plurality of seats to an x-axis reference point (0 point). The coordinate calculating unit 120 sets a head rest end of a vehicle front seat as a y-axis reference point (0 point).

In a current position checking step S130, the position determining unit 140 checks the current position of the plurality of seats. The position determining unit 140 may determine a current position of the seat based on the sensing value of the hole sensor.

In a coordinate calculating step S140, the coordinate calculating unit 120 determines a reference coordinate and an interference coordinate based on the current position of the seat. The reference coordinate includes a reference cushion coordinate range and a reference backrest coordinate range. The interference coordinate includes a cushion interference coordinate range and a backrest interference coordinate range.

In the motion sensing step S150, the motion sensing unit 130 senses a manual or automatic motion of a seat by the user. The motion sensing unit 130 senses a motion by the change in a sensing value of a hole sensor mounted in the seat.

In an interference determining step S160, the position determining unit 140 searches for a surrounding coordinate of a motion seat to determine whether to interfere with the other seat. When the position determining unit 140 senses that the other seat is located in the cushion interference coordinate range and the backrest interference coordinate range, the position determining unit 140 determines an interference situation of the other seat with respect to the motion seat.

In a normal control step S170, the controller 150 continuously controls the operation of the motion seat when it is not an interference situation of the motion seat and the other seat.

In a change control step S180, when it is determined that the motion seat interferes with the other seat, the controller 150 may stop the operation of the motion seat. At this time, the controller 150 controls a motion of the other seat to move out of the interference coordinate. When the motion of the other seat is completed, the controller 150 controls again the motion of the seat which stops the motion to prevent the interference situation with the other seat.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present disclosure do not limit the technical spirit of the present disclosure and the scope of the technical spirit is not limited by the exemplary embodiments and accompanying drawings.

As understood by those skilled in the art, steps and/or operations according to the present invention may be performed in different orders, or in parallel, or simultaneously in different exemplary embodiments for the other epoch.

Depending on the exemplary embodiment, some or all of the steps and/or operations may be at least partially implemented or performed using one or more processors which run instructions, programs, interactive data structures, clients and/or servers stored in one or more non-transitory computer-readable media. One or more non-transitory computer-readable medium may be software, firmware, hardware, and/or an arbitrary combination thereof. Further the function of the "module" discussed in the present specification may be implemented by software, firmware, hardware, and/or an arbitrary combination thereof.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A vehicle seat control apparatus, comprising:

at least one processor configured to:

calculate an interference coordinate based on a current position of a motion seat, among a plurality of seats in a vehicle, wherein the interference coordinate includes a cushion interference coordinate range and a backrest interference coordinate range of the motion seat, wherein the at least one processor is configured to set a reference cushion coordinate range based on a cushion upper end of the motion seat and set a range extended by at least one space in an x-axis direction and a y-axis direction based on the reference cushion coordinate range as the cushion interference coordinate range, wherein when a backrest of the motion seat is in a first state without an inclination, the at least one processor is configured to set a first reference backrest coordinate range based on a backrest rear end of the motion seat, and is configured to set a range extended by at least three spaces in the x-axis direction based on the first reference backrest coordinate range as the backrest interference coordinate range, wherein when the backrest of the motion seat is in a second state with a predetermined inclination, the at least one processor is configured to set a second reference backrest coordinate range based on an inclination and a size of the backrest, and is configured to set a range extended by at least three spaces in the x-axis direction based on the second reference backrest coordinate range as the backrest interference coordinate range;

determine whether the motion seat and another seat interfere with each other using the interference coordinate; and selectively control the motion seat or the another seat depending on whether the motion seat and the another seat interfere with each other.

2. The vehicle seat control apparatus according to claim 1, wherein the at least one processor is further configured to sense a manual or automatic motion of the motion seat.

3. A vehicle seat control method, comprising:

calculating an interference coordinate based on a current position of a motion seat, among a plurality of seats in a vehicle, by at least one processor;

determining whether the motion seat and another seat interfere with each other using the interference coordinate, by the at least one processor; and selectively controlling the motion seat or the another seat depending on whether the motion seat and the another seat interfere with each other, by the at least one processor, wherein the interference coordinate includes a cushion interference coordinate range and a backrest interference coordinate range of the motion seat, wherein the calculating the interference coordinate includes:

setting, by the at least one processor, a reference cushion coordinate range based on a cushion upper end of the motion seat, and setting, by the at least one processor, a range extended by at least one space in an x-axis direction and a y-axis direction based on the reference cushion coordinate range as the cushion interference coordinate range;

when a backrest of the motion seat is in a first state without an inclination, setting, by the at least one processor, a first reference backrest coordinate range based on a backrest rear end of the motion seat, and setting, by the at least one processor, a range extended by at least three spaces in the x-axis direction based on the first reference backrest coordinate range as the backrest interference coordinate range; and when the backrest of the motion seat is in a second state with a predetermined inclination, setting, by the at least one processor, a second reference backrest coordinate range based on an inclination and a size of a backrest, and setting, by the at least one processor, a range extended by at least three spaces in the x-axis direction based on the second reference backrest coordinate range as the backrest interference coordinate range.

4. The vehicle seat control method according to claim 3, further comprising:

after the calculating, sensing a manual or automatic motion of the motion seat by the at least one processor.

* * * * *